Sept. 13, 1932.  E. W. WILEY ET AL  1,876,812
MOTOR MOUNTING
Filed Oct. 5, 1931
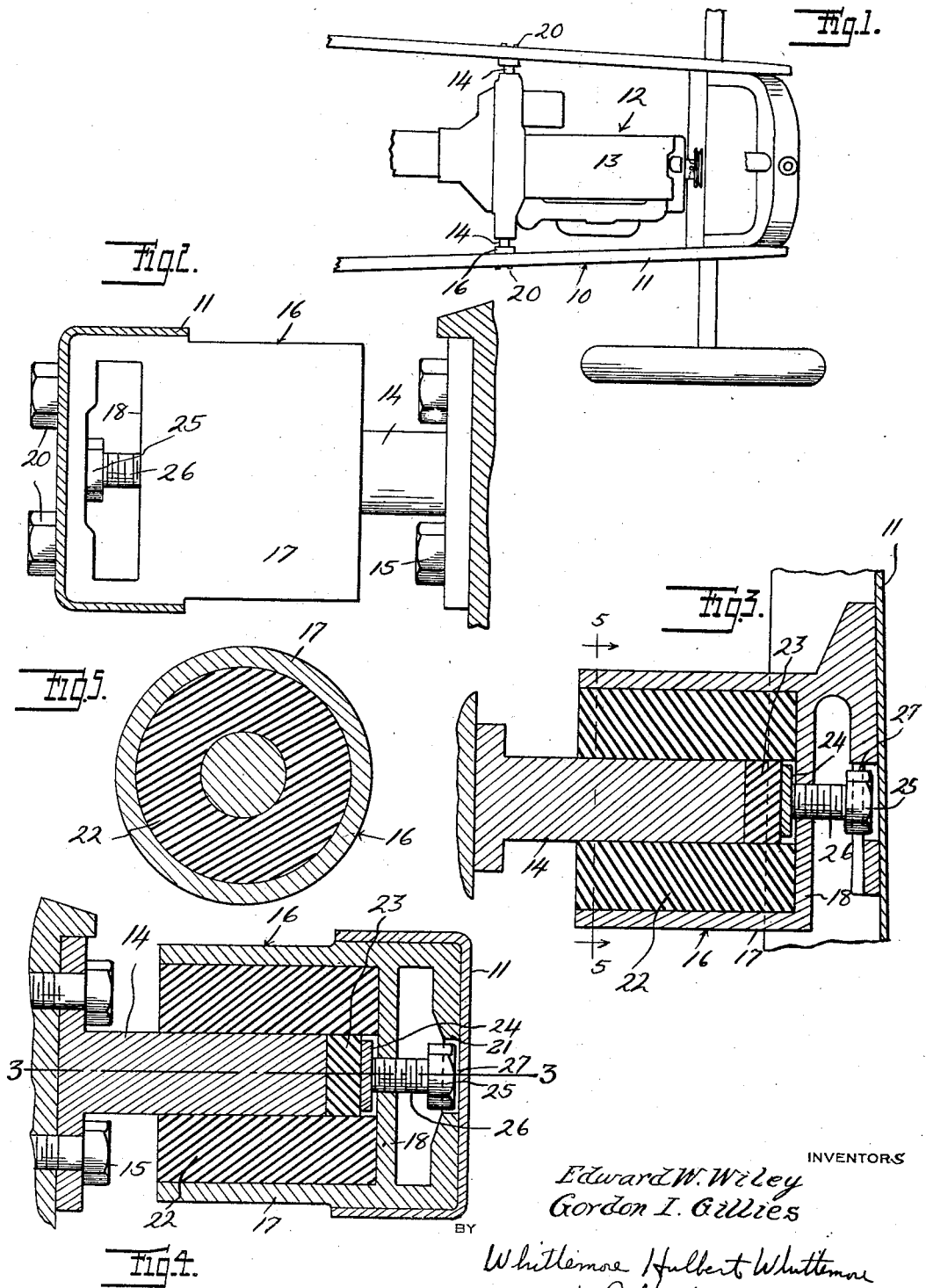
INVENTORS
Edward W. Wiley
Gordon I. Gillies
BY
Whittemore Hulbert Whittemore
+ Belknap
ATTORNEYS Patented Sept. 13, 1932

1,876,812

UNITED STATES PATENT OFFICE

EDWARD W. WILEY AND GORDON I. GILLIES, OF WINDSOR, ONTARIO, CANADA, ASSIGNORS TO HERBERT H. WILEY, OF UTICA, MICHIGAN

MOTOR MOUNTING

Application filed October 5, 1931, Serial No. 567,068, and in Canada September 3, 1931.

This invention relates generally to motor mountings and refers more particularly to mountings of the type especially adapted for fastening internal combustion engines to vehicle chassis frame members.

One of the principal objects of this invention is to provide a yieldable mounting for the engine on the chassis frame so designed as to not only insulate the engine from metallic contact with the frame, but to also effectively absorb any vibrations and pulsations set up by the engine prior to the same being transmitted to the chassis frame.

Another advantageous feature of the present invention resides in the provision of a mounting which, in addition to eliminating or reducing to a negligible quantity the magnitude of the vibrations or pulsations set up by the engine prior to being transmitted to the frame as previously stated, further functions as a durable and effective connection between the engine and chassis frame members.

A further object of this invention resides in the provision of means associated with the mounting for adjusting the degree of pressure exerted thereby on parts of the engine and thereby permit obtaining maximum efficiency from the mounting under varying conditions.

A still further object of this invention is to provide a mounting of the type previously set forth which is relatively simple in construction and is capable of being inexpensively manufactured, assembled and installed.

The foregoing as well as other objects will be made more apparent as this description proceeds, especially when considered in connection with the accompanying drawing; wherein:

Figure 1 is a fragmentary plan view partly in section of a vehicle chassis illustrating our improved motor mountings;

Figure 2 is an enlarged side elevational view of one of the motor mountings shown in Figure 1;

Figure 3 is a sectional view taken substantially on the line 3—3 of Figure 4;

Figure 4 is a sectional view taken on a plane at substantially right angles to the plane of section illustrated in Figure 3;

Figure 5 is a sectional view taken on the line 5—5 of Figure 3.

Referring now to the drawing, it will be noted that there is illustrated in Figure 1 a chassis frame 10 comprising laterally spaced inwardly opening channel-shaped sill members 11 held in lateral spaced relation to each other by the usual cross braces (not shown). As is usually the case, the chassis frame 10 forms a support for the power unit diagrammatically illustrated in Figure 1 by the reference character 12. The power unit 12 is preferably constructed in accordance with the conventional practice and comprises an internal combustion engine 13 of the multicylinder reciprocating type.

Extending laterally outwardly from opposite sides of the power unit 12 is a pair of motor arms 14 having the inner ends thereof rigidly secured to the sides of the power unit by means of fastener elements 15 and having the outer ends thereof yieldably clamped to the sills 11 through the intermediary of the mountings 16 to be presently described. The outer end portions of the arms 14 are preferably, although not necessarily, circular in cross section and the length of the arms is so determined that the outer extremities thereof assume positions spaced inwardly from the marginal inner edges of the channel-shaped sills so as to provide for removing or assembling the power unit with the chassis frame while the arms are attached thereto.

Referring now more in detail to the particular construction of the mountings 16, it will be noted that each of the latter comprises a metallic housing 17 tubular in cross section and having an internal diameter substantially greater than the diameter of the circular outer end portions of the arms 14. The outer end portions of the housings are adapted to extend within the channels of the sills 11, while the inner end portions thereof extend inwardly beyond the sills for receiving the major portions of the arms 14 in substantially concentric relation therewith. The housings may be formed of cast or pressed metal whichever is desired and are provided with outer end walls 18 spaced a substantial distance outwardly from the adjacent ends of the arms 14 when the latter are in assembled relation with housings. In order to secure the housings in assembled relation with the sills, the former are provided with attaching portions spaced outwardly from the end walls 18 for engagement with the inner surfaces of the base portions of the channel-shaped sills and adapted to be secured to the latter by suitable fastening means 20.

As previously stated, it is one of the objects of the invention to associate means with the mounting for insulating the power unit from metallic contact with the frame and for absorbing or minimizing the magnitude of the vibrations and pulsations set up by the power unit prior to the same being transmitted to the chassis frame. The foregoing is accomplished in the present instance by disposing sleeves 22 within the housings formed of resilient non-metallic material such as rubber or rubber composition and having an internal diameter determined to receive the outer ends of the motor arms 14. In actual practice, the external diameter of the yieldable sleeves is substantially greater than the internal diameter of the housings, with the result that in the assembled relation of the aforesaid parts the sleeves will be secured within the housings under compression and the inner walls of the same yieldably grips the arms. It will further be observed that the difference in the diameters of the housings and arms is so determined as to provide for employing relatively thick sleeves therebetween of sufficient resiliency to effectively absorb the vibrations and pulsations prior to the latter being transmitted to the frame.

While with the above arrangement the motor arms are adapted to be yieldably gripped by the sleeves 22 under compression within the housing, nevertheless, we provide supplemental means in the housings for yieldably resisting axial movement of the arms relative to the support or in other words, to restrict lateral shifting movement of the power unit. The aforesaid means comprises non-metallic yieldable blocks 23 preferably formed of the same material from which the sleeves 22 are formed and adapted to assume positions within the sleeves 22 between the outer ends of the arms 14 and the adjacent sides of the end walls 18. The blocks 23 are also normally arranged under compression to exert a yielding force on the outer ends of the arms 14 and are maintained in this state by means of washers 24 normally maintained in engagement with the outer sides of the blocks by means of bolts 25 having shank portions 26 threadedly mounted within openings formed in the end walls 18 of the housings. The attaching portions 21 of the housings are slotted as at 27 for receiving the heads of the bolts 25 and the latter are accessible through the space provided between the attaching portions and end walls 18. By virtue of this latter arrangement, it will be apparent that subsequent to assembling the mountings with the arms 14, the blocks 23 may be placed under the desired compression by manipulating the adjustable screws 26. It will further be observed that with the above construction, the pressure exerted by the blocks 23 may be maintained substantially constant irrespective of slight variations in the blocks by adjusting the bolt 25 to compensate for these variations.

Thus, from the foregoing it is believed obvious that we have provided a relatively simple and inexpensive motor mounting so designed as to completely insulate the power unit from metallic contact with the frame and to effectively absorb vibrations set up by the power unit prior to their transmission to the chassis frame.

What we claim as our invention is:

1. A mounting for attaching a power unit to a vehicle chassis having a side sill, comprising a housing rigidly secured to the side sill, a supporting arm projecting from the power unit into the inner end of said housing in spaced relation to the side walls thereof, a sleeve formed of resilient material arranged under compression within the housing between the side walls of the latter and adjacent walls of the arm, and a resilient block arranged within and adjustable longitudinally of said sleeve for engaging the free end of said arm.

2. A mounting for attaching a power unit to a vehicle chassis having a side sill, comprising a housing rigidly secured to the side sill and extending inwardly therefrom, a supporting arm projecting outwardly from the power unit and extending into the housing in spaced relation to the side and end walls thereof, a sleeve formed of resilient material arranged under compression within the housing between the side walls of the latter and adjacent walls of the arm, a pad of resilient material arranged under compression within the sleeve and engageable with the free end of the arm, and means extending within said sleeve cooperating with the pad for exerting a pressure on the free end of said arm.

3. A mounting for attaching a power unit to a vehicle chassis having a side sill, comprising a housing rigidly secured to the side sill and extending rigidly therefrom, a supporting arm projecting outwardly from the power unit and extending into the housing in spaced relation to the side walls thereof, a sleeve formed of resilient material arranged under compression within the housing between the side walls of the latter and adjacent walls of the arm, a resilient block arranged under compression within the sleeve and engageable with the free end of the arm, means for exerting a pressure thereon, and adjustable means for varying the pressure exerted by said block.

4. A mounting for attaching a power unit to a vehicle chassis having a side sill, comprising a housing rigidly secured to the side sill and extending inwardly therefrom, a supporting arm projecting laterally outwardly from the power unit and extending into the housing in spaced relation to the sides and end walls thereof, resilient material arranged under compression within the housing between the side and end walls of the latter and the adjacent walls of the arm, and means for varying the pressure exerted by said resilient means on the end wall of said arm.

5. A mounting for attaching a power unit to a vehicle chassis having a side sill, comprising a housing having the outer end thereof rigidly secured to the sill and having an opening in the inner end thereof, a resilient member arranged within the housing under compression and having a centrally arranged opening therein, a supporting arm extending from the power unit and engageable within the opening in said resilient member, a second resilient member located within the opening in said first mentioned member and engageable with the end of the supporting arm, and means for placing the same under compression comprising, an adjustable element carried in the end of the housing and movable relative thereto for varying the pressure exerted by said resilient member against the end wall of said arm.

6. A mounting for attaching a power unit to a vehicle chassis having a side sill, comprising a housing having one end fashioned with a slotted attaching portion rigidly secured to the side sill and having an opening in the other end thereof, a resilient member arranged within the housing under compression and having a centrally arranged opening extending longitudinally thereof, a supporting arm extending from the power unit and engageable within a portion of the opening in said resilient member, a second resilient member arranged within the opening in said first mentioned member and engaging the free end of said arm under compression, and means for varying the pressure exerted by said second resilient member against the end of said arm comprising, a bolt threadedly mounted for adjustment within the end of the housing having the head thereof arranged within the slotted portion of the housing aforesaid and having the other end thereof adapted to engage a metallic member for varying the pressure against the said second mentioned resilient member.

In testimony whereof we affix our signatures.

EDWARD W. WILEY.
GORDON I. GILLIES.